(12) United States Patent
Lim et al.

(10) Patent No.: US 11,874,026 B2
(45) Date of Patent: Jan. 16, 2024

(54) AIR CONDITIONER AND CONTROL METHOD THEREFOR

(71) Applicant: Samsung Electronics Co., Ltd., Suwon-si (KR)

(72) Inventors: Jungsoo Lim, Suwon-si (KR); Kyoungmok Kim, Suwon-si (KR); Seulkiro Kim, Suwon-si (KR); Sunhee Park, Suwon-si (KR); Hyesoon Yang, Suwon-si (KR); Kisup Lee, Suwon-si (KR); Sinyoung Lee, Suwon-si (KR); Jongho Lee, Suwon-si (KR); Mingyu Jung, Suwon-si (KR); Jeongsu Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 17/309,521

(22) PCT Filed: Nov. 29, 2019

(86) PCT No.: PCT/KR2019/016724
§ 371 (c)(1),
(2) Date: Jun. 3, 2021

(87) PCT Pub. No.: WO2020/116866
PCT Pub. Date: Jun. 11, 2020

(65) Prior Publication Data
US 2022/0010993 A1     Jan. 13, 2022

(30) Foreign Application Priority Data

Dec. 4, 2018   (KR) .................. 10-2018-0154552

(51) Int. Cl.
*F24F 8/60*       (2021.01)
*B01D 53/02*   (2006.01)
(Continued)

(52) U.S. Cl.
CPC .............. *F24F 8/60* (2021.01); *B01D 53/02* (2013.01); *B01D 53/62* (2013.01); *F24F 7/08* (2013.01);
(Continued)

(58) Field of Classification Search
CPC ....... F24F 8/60; F24F 8/15; F24F 8/95; B01D 53/02; B01D 53/62
See application file for complete search history.

(56) References Cited

U.S. PATENT DOCUMENTS 7,658,786 B2    2/2010   Lin

FOREIGN PATENT DOCUMENTS

| CN | 2606286 Y | 3/2004 | |
|---|---|---|---|
| CN | 107091503 A * | 8/2017 | ............... A61L 9/22 |

(Continued)

OTHER PUBLICATIONS

Supplementary European Search Report dated Feb. 17, 2022, in connection with European Application No. 19893492.9, 10 pages.

(Continued)

*Primary Examiner* — Robert A Hopkins (57) ABSTRACT

Disclosed is an air conditioner for creating a comfortable indoor environment. The air conditioner includes an indoor unit configured to have a carbon dioxide remover for filtering carbon dioxide from indoor air to supply clean air into a room, and discharging the filtered carbon dioxide to the outside, an outdoor unit configured to have an oxygen generator for separating oxygen from outdoor air introduced from the outside to supply the separated oxygen into the room, and discharging residues from which the oxygen is separated to the outside; and a processor configured to control the carbon dioxide remover and the oxygen generator to discharge the filtered carbon dioxide and the residues to the outdoor together. According to the disclosure, by first (Continued)

removing the carbon dioxide from the room and then discharging the carbon dioxide and the residues while operating the oxygen generator, a piping installation operation by a simple piping structure as well as an efficient operation is possible.

14 Claims, 10 Drawing Sheets

(51) Int. Cl.
    *B01D 53/62*     (2006.01)
    *F24F 8/15*     (2021.01)
    *F24F 8/95*     (2021.01)
    *F24F 7/08*     (2006.01)
    *F24F 7/00*     (2021.01)

(52) U.S. Cl.
    CPC ............... *F24F 8/15* (2021.01); *F24F 8/95* (2021.01); *F24F 2007/001* (2013.01)

(56) References Cited

FOREIGN PATENT DOCUMENTS

| | | |
|---|---|---|
| JP | H02-136631 A | 5/1990 |
| JP | H078737 A * | 1/1995 |
| JP | 2005-055058 A | 3/2005 |
| JP | 2005-147484 A | 6/2005 |
| JP | 3873945 B2 | 1/2007 |
| JP | 4033190 B2 | 1/2008 |
| KR | 10-0416500 B1 | 1/2004 |
| KR | 10-2004-0074534 A | 8/2004 |
| KR | 10-0551952 B1 | 9/2005 |
| KR | 20-0406805 Y1 | 1/2006 |
| KR | 10-0715532 B1 | 5/2007 |
| KR | 10-0964366 B1 | 6/2010 |
| KR | 10-2011-0077702 A | 7/2011 |
| KR | 10-2011-0132234 A | 12/2011 |
| KR | 10-1136061 B1 | 4/2012 |
| KR | 10-1585621 B1 | 1/2016 |
| KR | 10-1589253 B1 | 1/2016 |
| KR | 10-1767640 B1 | 8/2017 |
| WO | 2018150583 A1 | 12/2019 |

OTHER PUBLICATIONS

International Search Report and Written Opinion of the International Searching Authority dated Mar. 18, 2020 in connection with International Application No. PCT/KR2019/016724, 11 pages.
Korean Office Action dated Jul. 18, 2023, in connection with Korean Patent Application No. 10-2018-0154552, 15 pages.
Communication pursuant to Article 94(3) EPC dated Nov. 30, 2023, in connection with European Patent Application No. 19893492.9, 5 pages.

* cited by examiner

<CHANGE IN CO2/O2 CONCENTRATIONS IN 5-PYEONG
SPACE WHEN TWO ADULTS STAY IN ROOM>

AIR CONDITIONER AND CONTROL METHOD THEREFOR

CROSS-REFERENCE TO RELATED APPLICATIONS

This application is a 371 National Stage of International Application No. PCT/KR2019/016724, filed Nov. 29, 2019, which claims priority to Korean Patent Application No. 10-2018-0154552 filed on Dec. 4, 2018, the disclosures of which are herein incorporated by reference in their entirety.

BACKGROUND

1. Field

The disclosure relates to an air conditioner capable of creating a comfortable indoor environment by controlling carbon dioxide and oxygen concentrations in a room and a method for controlling the same.

2. Description of Related Art

Ventilation is the most efficient way to maintain the same concentration of the entire air compositions, such as oxygen and carbon dioxide, including volatile organic compounds and odors in indoor air, as the concentration of the outside. However, recently, a deterioration in air quality due to external air pollution makes ventilation difficult even in a home environment, and the ventilation is more difficult due to the energy efficiency of heating and cooling in buildings. To overcome the problem, a ventilation device or the like using a separate total heat exchanger has been applied, but has a problem in that energy consumption is high and a line diameter for connection with an air conditioner should be large.

The main function of the air conditioner is to control the indoor temperature and humidity by using heat exchange according to compression and expansion of a refrigerant, but has been developed to control most of the factors influencing indoor air quality, including a dust collection function that can remove fine dust and a deodorizing function that can remove odor molecules such as indoor volatile organic compounds according to recent changes in consumer environment. However, the biggest part that is difficult to control in terms of the main factors of the indoor air quality is a change in oxygen and carbon dioxide concentrations according to respiration of a human body or a pet. In the case of the oxygen, a technology for performing control by using an air conditioner with a built-in oxygen generating device built in (Korean Patent No. 0964,366) or a separate oxygen generator (Korean Patent Laid-Open Publication No. 2002-0007251) is disclosed.

The conventional devices for improving indoor air quality have focused on individual control, such as supplementing oxygen or removing carbon dioxide to or from indoor air using an oxygen generating device, a carbon dioxide removal device, or the like.

SUMMARY

An object of the disclosure is to provide an air conditioner capable of creating a comfortable indoor environment by removing carbon dioxide from indoor air and supplying oxygen to a room, and a method for controlling the same.

Another object of the disclosure is to provide an air conditioner that has a simple structure and is capable of efficiently discharging residues separated from removed carbon dioxide and oxygen, and a method for controlling the same.

In an aspect, an air conditioner is provided. The air processor may include: an indoor unit configured to have a carbon dioxide remover for filtering carbon dioxide from indoor air to supply clean air into a room, and discharging the filtered carbon dioxide to the outside; an outdoor unit configured to have an oxygen generator for separating oxygen from outdoor air introduced from the outside to supply the separated oxygen into the room, and discharging residues from which the oxygen is separated to the outside; and a processor configured to control the carbon dioxide remover and the oxygen generator to discharge the filtered carbon dioxide and the residues to the outdoor together.

A pipe structure of the air conditioner may include: a first exhaust pipe configured to discharge the filtered carbon dioxide; a second exhaust pipe configured to discharge the residues by the oxygen generator; and a third exhaust pipe configured to join the first exhaust pipe and the second exhaust pipe.

The third exhaust pipe may include a Venturi connection or an exhaust pump.

The oxygen generator may include a compressor that applies a pressure to the introduced outside air, and the compressor may be configured to discharge the residues through the second exhaust pipe and the third exhaust pipe, and provide a pressure difference between the first exhaust pipe and the third exhaust pipe to discharge the filtered carbon dioxide through the first exhaust pipe.

The air conditioner may further include: a refrigerant pipe configured to circulate a refrigerant between the indoor unit and the outdoor unit and an oxygen supply pipe configured to supply the separated oxygen, in which the refrigerant pipe and the oxygen supply pipe may be integrally coupled and extended.

The processor may be configured to control the carbon dioxide remover and the oxygen generator to first perform the filtering and supplying of the carbon dioxide and then perform the separation and supply of the oxygen.

The carbon dioxide remover may include an adsorbent made of at least one of zeolite, a metal organic framework (MOF), and a porous carbon material.

The carbon dioxide remover may remove the adsorbent to which the carbon dioxide is adsorbed for a predetermined time by applying heat or pressure.

The air conditioner may further include: a first exhaust pipe configured to discharge the filtered carbon dioxide; a first supply pipe configured to connect an oxygen supply port of the oxygen generator; a connection pipe configured to connect the first exhaust pipe and the first supply pipe; a second exhaust pipe configured to discharge the residues by the oxygen generator; a first switching valve configured to be provided between the first exhaust pipe and the connection pipe; and a second switching valve configured to be provided between the first supply pipe and the connection pipe.

The carbon dioxide remover may be configured to operate in a carbon dioxide removal mode for filtering carbon dioxide from the indoor air to supply clean air to the room and a carbon dioxide discharge mode for discharging the filtered carbon dioxide to the outside, and the oxygen generator may be configured to operate in an oxygen supply mode in which the outdoor air introduced from the outside is pressurized to separate the oxygen and the residues to supply into the room, and an oxygen discharge mode in which the separated residues are discharged to the outside.

The processor may be configured to control the first and second switching valves to sequentially perform the carbon dioxide discharge mode and the oxygen supply mode through the connection pipe.

The outdoor unit may include a blower fan, and the processor may be configured to operate the blower fan when the carbon dioxide is discharged and the residues are discharged.

In another general aspect, an air conditioner is provided. The air conditioner may include an indoor unit, an outdoor unit, and a processor configured to control the indoor unit and the outdoor unit. The indoor unit or the outdoor unit may include: a carbon dioxide remover configured to filter carbon dioxide from indoor air to supply clean air into a room, and discharge the filtered carbon dioxide to the outside; and an oxygen generator configured to separate oxygen from outdoor air introduced from the outside to supply the separated oxygen into the room, and discharge residues from which the oxygen is separated to the outside, and the processor may be configured to control the carbon dioxide remover and the oxygen generator to discharge the filtered carbon dioxide and the residues to the outdoor together.

The indoor unit may include the carbon dioxide remover and the oxygen generator, and the outdoor unit may include a suctionor configured to suck outdoor air and a discharger configured to discharge the carbon dioxide generated from the indoor unit.

The outdoor unit may include a blower fan, the suctionor may be located on an opposite side of the blower fan, and the discharger may be located on the blower fan so that the carbon dioxide discharged to the outside does not flow back into the suctionor.

In another general aspect, an air conditioner is provided. The air conditioner may include a carbon dioxide remover configured to operate in a carbon dioxide removal mode in which carbon dioxide is filtered from the indoor air to supply clean air into the room and a carbon dioxide discharge mode in which the filtered carbon dioxide is discharged to the outside; an oxygen generator configured to operate in an oxygen separation mode in which outdoor air introduced from the outside is pressurized and separated into oxygen and residues to supply into the room and an oxygen discharge mode in which the separated residues are discharged to the outside; and a processor configured to simultaneously perform the carbon dioxide discharge mode and the residue discharge mode so that the filtered carbon dioxide and the separated residues are discharged together.

In another general aspect, a method for controlling an electronic device is provided. The method for controlling an air conditioner may include: operating a carbon dioxide remover to absorb carbon dioxide from indoor air with an adsorbent to filter the adsorbed carbon dioxide, and supply clean air into a room; operating the carbon dioxide remover to remove the adsorbed carbon dioxide to discharge the adsorbed carbon dioxide, and simultaneously operating an oxygen generator to pressurize outdoor air introduced from the outside to separate oxygen from residues to supply into the room; and controlling the carbon dioxide remover and the oxygen generator to simultaneously discharge the removed carbon dioxide and the residues.

According to the disclosure, it is possible for a carbon dioxide remover installed in an indoor unit of an air conditioner to remove carbon dioxide having the highest impact on a human body and a fastest accumulation rate in indoor air with an adsorbent, discharge residues such as nitrogen separated from oxygen and the removed carbon dioxide to the outside together by operating an oxygen generator provided with a pressurizing means at the time when the high-concentration carbon dioxide that has been removed by the regeneration of the adsorbent, and efficiently manage the indoor air by introducing the oxygen separated from the oxygen generator into the room.

In addition, it is possible to overcome the space limitations of the indoor unit and the outdoor unit by reducing the number of related parts when the carbon dioxide remover and the oxygen generator are separately operated.

In addition, the outdoor unit and the indoor unit may be connected by one connection line, the separate switching valves are installed on inlet and outlet sides of a connection line, and then the carbon dioxide remover is first operated to reduce the indoor carbon dioxide concentration and discharge the adsorbed high-concentration carbon dioxide, and then the oxygen generator is operated to supplement the insufficient oxygen concentration, so the piping structure may be simple and the piping installation may be convenient.

In addition, flow paths of each gas that moves between the outdoor unit and the indoor unit are integrally formed with a refrigerant pipe connecting the indoor unit and the outdoor unit to form the separate connection line, so a piping structure may be simple and an piping installation may be convenient.

DETAILED DESCRIPTION

Hereinafter, embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In embodiments of the disclosure, terms including ordinal numbers such as first and second are used only for the purpose of distinguishing one component from other components, and singular expressions include plural expressions unless the context clearly indicates otherwise. Also, in embodiments of the disclosure, it should be understood that terms such as 'configured', 'include', and 'have' do not preclude the existence or addition possibility of one or more other features or numbers, steps, operations, components, parts, or combinations thereof. In addition, in the embodiment of the disclosure, terms such as 'top', 'bottom', 'left', 'right', 'inside', 'outside', 'inner surface', 'outer surface', 'front', and 'rear' are defined based on the drawings, and shapes or positions of each component are not limited thereby. In addition, in embodiments of the disclosure, at least one of the plurality of elements refers to not only all of the plurality of elements, but also each one or all combinations thereof excluding the rest of the plurality of elements.

Figure 1:
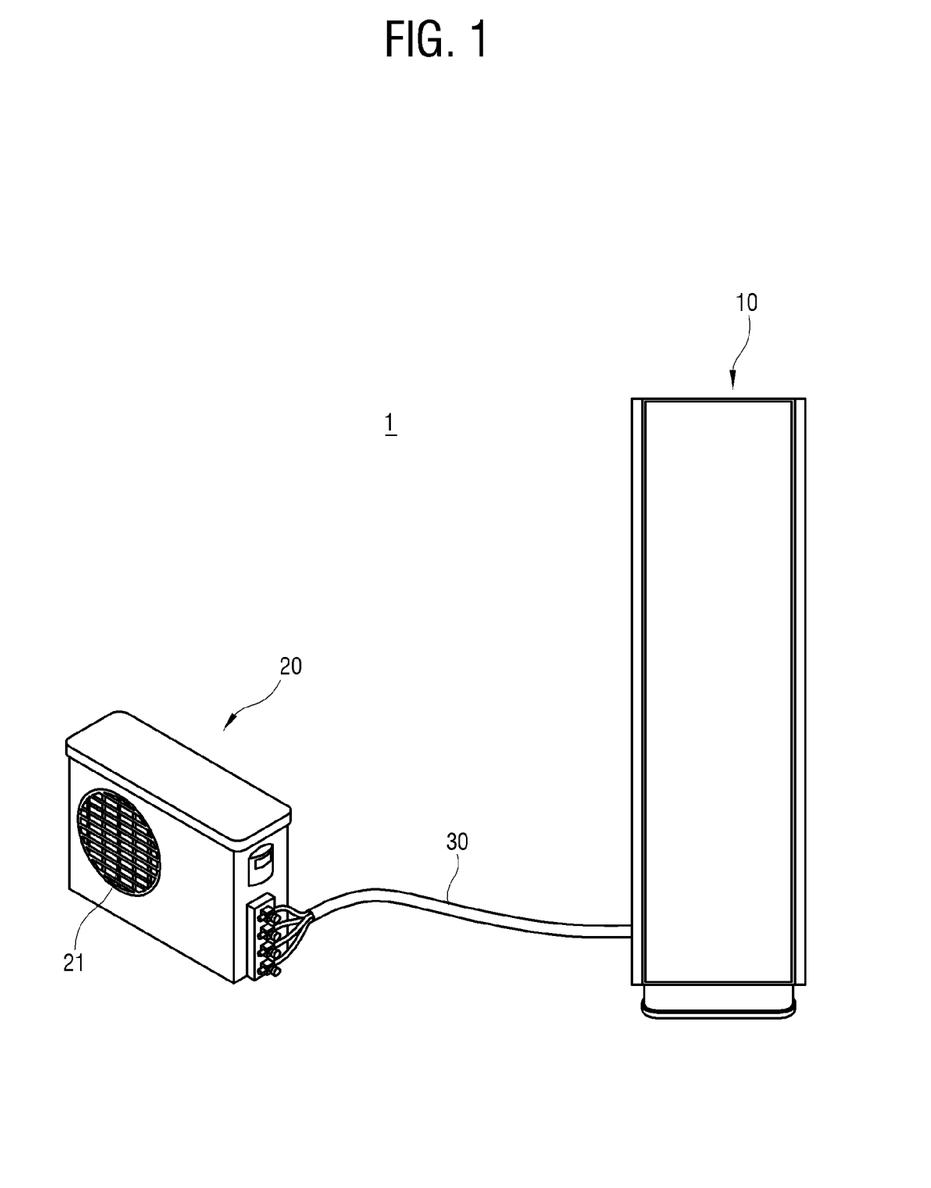
FIG. 1 is a perspective view illustrating an air conditioner according to a first embodiment of the disclosure.

FIG. 1 is a perspective view illustrating an air conditioner 1 according to a first embodiment of the disclosure. The air conditioner 1 includes an indoor unit 10, an outdoor unit 20, and a piping assembly 30 for transmitting a refrigerant, carbon dioxide, and oxygen between the indoor unit 10 and the outdoor unit 20.

The air conditioner 1 may further include at least one of a household air conditioner, a system air conditioner, an air conditioner, a ventilator, an air purifier, a humidifier, and a heater.

The indoor unit 10 may be applied to any of a stand type indoor unit, a wall-mounted indoor unit, and a ceiling type indoor unit, but in FIG. 1, the stand type indoor unit 10 will be described as an example.

The indoor unit 10 receives a refrigerant from the outdoor unit 20 and discharges hot and cold air to a room. The indoor unit 10 receives oxygen from the outdoor unit 20 and discharges the supplied oxygen to a room. The indoor unit 10 sucks indoor air and adsorbs carbon dioxide, and then discharges the air back to the room. In addition, the indoor unit 10 and the outdoor unit 20 operate according to input operation setting by being connected to a communication line or by communicating using a power line.

The indoor unit 10 includes an indoor heat exchanger (not illustrated), a fan (not illustrated), and an expansion valve (not illustrated) through which the supplied refrigerant is expanded.

The outdoor unit 20 transmits the compressed and evaporated refrigerant to the indoor unit 10. The outdoor unit 20 sucks outdoor air to separate oxygen and transmit the sucked oxygen to the indoor unit 10 through the piping assembly 30.

The outdoor unit 20 includes a compressor (not illustrated) that receives and compresses a refrigerant, an outdoor heat exchanger (not illustrated) that exchanges heat between the refrigerant and outdoor air, an accumulator (not illustrated) that extracts gaseous refrigerant from the supplied refrigerant and supplies the extracted refrigerant to the compressor, and a four-way valve (not illustrated) that selects a flow path of the refrigerant according to a heating operation. In addition, the outdoor unit 20 may further include a plurality of sensors, valves, an oil recovery device, and the like.

Figure 2:
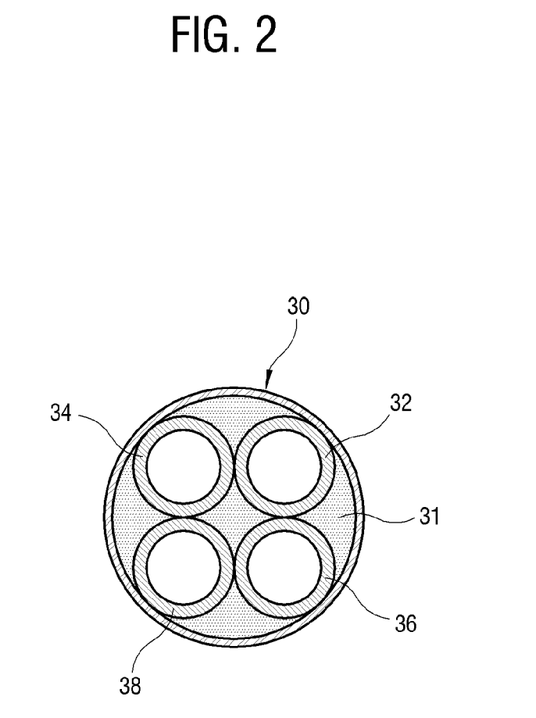
FIG. 2 is a cross-sectional view illustrating a piping assembly of FIG. 1.

FIG. 2 is a cross-sectional view of the piping assembly 30. The piping assembly 30 includes refrigerant pipes 32 and 34 that exchange a refrigerant between the indoor unit 10 and the outdoor unit 20, a first exhaust pipe 36 that discharges carbon dioxide removed (adsorbed) from the indoor unit 10, and a supply pipe 38 that transmits oxygen generated by the outdoor unit 20 to the indoor unit 10. The refrigerant pipes 32 and 34, the first exhaust pipe 36, and the supply pipe 38 are integrally covered with an insulating material 31. The refrigerant pipes 32 and 34, the first exhaust pipe 36, and the supply pipe 38 may be individually manufactured or may be integrally made of the same material by injection molding. Obviously, the refrigerant pipes 32 and 34 may each be manufactured as a copper pipe, and the first exhaust pipe 36 and the supply pipe 38 may be made of plastic by the injection molding. When the refrigerant pipes 32 and 34, the first exhaust pipe 36, and the supply pipe 38 are integrally manufactured, a piping structure and a piping installation may be simplified.

Figure 3:
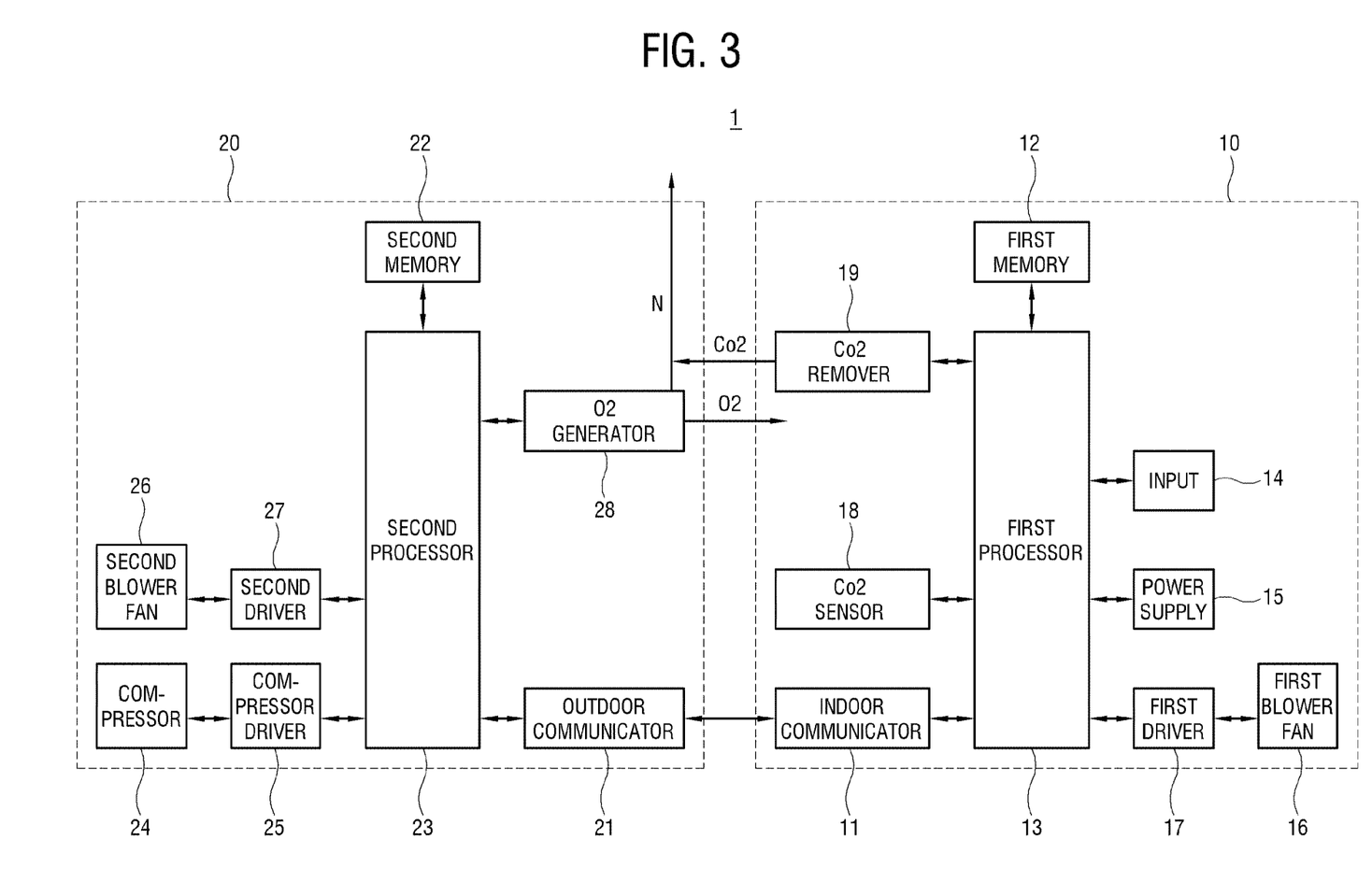
FIG. 3 is a block diagram of the air conditioner according to the first embodiment of the disclosure.

FIG. 3 is a block diagram of the air conditioner 1 according to the embodiment of the disclosure.

The indoor unit 10 includes an indoor communicator 11, a first memory 12, a first processor 13, an input 14, a power supply 15, a first blower fan 16, a first fan driver 17, a carbon dioxide sensor 18, and a carbon dioxide remover 19.

The indoor communicator 11 as a communication unit of the indoor unit may include at least one communication module, and may exchange data, a control command, or the like through a communication line connected to the outdoor unit 20, or communicate with each other to operate the outdoor unit 20 according to operation settings input to the indoor unit 10.

In addition, the communication method between the indoor unit 10 and the outdoor unit 20 may be a wireless communication method such as Wi-fi, Bluetooth, Beacon, and Zigbee, as well as wired communication.

The first memory 12 may store various data for the overall operation of the indoor unit 10, such as a program for processing or controlling the first processor 13. The first memory 12 may store reference data for controlling the outdoor unit 20 and data transmitted and received through the indoor communicator 11.

The first processor 13 may control the overall operation of each component of the indoor unit 10 in response to data received from the outdoor unit 20 and control data transmission/reception through the indoor communicator 11.

The first processor 13 may control power supplied to the outdoor unit 20 through the power supply 15.

The first processor 13 may control the operation of the carbon dioxide remover 19 according to the indoor carbon dioxide concentration detected by the carbon dioxide sensor 18. The first processor 13 may control a carbon dioxide removal mode and a carbon dioxide emission mode of the carbon dioxide remover 19.

The input 14 as an input unit may include a plurality of buttons or a touch screen attached to the indoor unit 10. The input 14 may be operated by turning on a power supply of the indoor unit 10 through the plurality of buttons or the touch screen. The input 14 may input an operating condition of the carbon dioxide remover 19, for example, an indoor carbon dioxide concentration.

The input 14 may input not only power input, but also a carbon dioxide removal command, an operation command, a trial run command, and a command for a test operation, address setting, operating frequency setting of the outdoor unit 20 when a communication error occurs, operation mode setting of the indoor unit 10 when the communication error occurs, and the like.

The power supply 15 may supply power necessary for an operation of each component under the control of the first processor 13.

The first blower fan 16 may be constituted by a motor and a fan, and rotates as the motor operates under the control of the first fan driver 17.

The first fan driver 17 may include a circuit for driving the first blower fan 16. The first fan driver 17 may control the first blower fan 16 in response to a control signal of the first processor 13. The first fan driver 17 may control a rotational operation and a rotational speed by supplying operating power to the first blower fan 16.

The carbon dioxide sensor 18 may detect the indoor carbon dioxide concentration in real time and provide the detected indoor carbon dioxide concentration to the first processor 13. The first processor 13 may remove the indoor carbon dioxide by operating the carbon dioxide remover 19 when the indoor carbon dioxide concentration exceeds a predetermined value.

The indoor unit 10 may further include an oxygen sensor (not illustrated) included in an indoor air.

The carbon dioxide remover 19 may suck the indoor air, adsorb and remove carbon dioxide, and then circulate the indoor air back into a room. The carbon dioxide remover 19 may remove the adsorbed carbon dioxide and discharge the carbon dioxide to the outdoor unit 20 through the first exhaust pipe 36 of the piping assembly 30. The configuration and operation description of the carbon dioxide remover 19 will be separately described in detail.

The outdoor unit 20 may include an outdoor communicator 21, a second memory 22, a second processor 23, a compressor 24, a compressor driver 25, a second blower fan 26, a second fan driver 27, and an oxygen generator 28.

The outdoor communicator 21 as a communication unit of the outdoor unit may include at least one communication module, and may exchange data through a communication line connected to the indoor unit 10 or exchange operation state information by communicating with each other.

The communication method between the indoor unit 10 and the outdoor unit 20 may be a wireless communication method such as Wi-fi, Bluetooth, Beacon, and Zigbee, as well as a wired communication method.

The second memory 22 may store various data for the overall operation of the outdoor unit 20, such as a program for processing or controlling the second processor 23. For example, the second memory 22 may store control data for controlling the operation of the outdoor unit 20, data detected during the operation of the outdoor unit, and input/output data.

The second memory 22 may store reference data for controlling the compressor 24, the second blower fan 26, and the oxygen generator 28, and data transmitted/received through the outdoor communicator 21.

The second processor 23 may control the overall operation of each unit in the outdoor unit 20.

The second processor 23 may control the operation of the outdoor unit 20 in response to the data received from the outdoor unit 20 and control the data transmission/reception through the outdoor communicator 21.

The second processor 23 may receive power from the indoor unit 10 and control the overall operation of each unit.

The second processor 23 may generate control signals for controlling the compressor 24, the second blower fan 26, and the oxygen generator 28 according to the operation settings received from the indoor unit 10, respectively, and provide the generated control signals to the compressor driver 25, the second fan driver 27, and the oxygen generator 28.

The second processor 23 may determine the state of the refrigerant of the compressor 24, the second blower fan 26, and the oxygen generator 28 in response to the data input from the plurality of sensors, generate a control command in response to the determined state, and apply the generated control command to the compressor driver 25, the second fan driver 27, and the oxygen generator 28.

The compressor 24 compresses and evaporates the refrigerant and provides the compressed and evaporated refrigerant to the indoor unit 10.

The compressor driver 25 includes a circuit for driving the compressor 24 and may drive the compressor 24. In this case, the compressor driver 25 may supply operating power to the motor of the compressor 24 so that the compressor 24 operates at a specific operating frequency. Accordingly, the compressor 24 compresses an incoming low-temperature and low-pressure refrigerant to discharge a high-temperature and high-pressure refrigerant.

The compressor driver 25 may drive the compressor 24 at a predetermined frequency according to the control command of the second processor 23, and drive the compressor 24 at a preset frequency when the communication error with the indoor unit 10 occurs.

The second blower fan 26 may be provided in the outdoor heat exchanger and suck and supply outdoor air so that the refrigerant supplied from the compressor 24 is introduced into the heat exchanger to exchange heat with the outdoor air, and discharge the heat-exchanged air to the outside. In this case, the second blower fan 26 may be constituted by a motor and a fan, and the fan rotates as the motor operates under the control of the first fan driver 27.

The second fan driver 27 may include a circuit for driving the fan to drive the fan. The second fan driver 27 may control the second blower fan 26 in response to the control signal of the second processor 23. The second fan driver 27 may control a rotational operation and a rotational speed by supplying the operating power to the second blower fan 26.

The oxygen generator 28 may suck the outdoor air to generate oxygen, and discharge residues other than oxygen to the outside. The oxygen generator 28 may supply the generated oxygen to the indoor unit 10 through the supply pipe 38 of the piping assembly 30.

Figure 4:
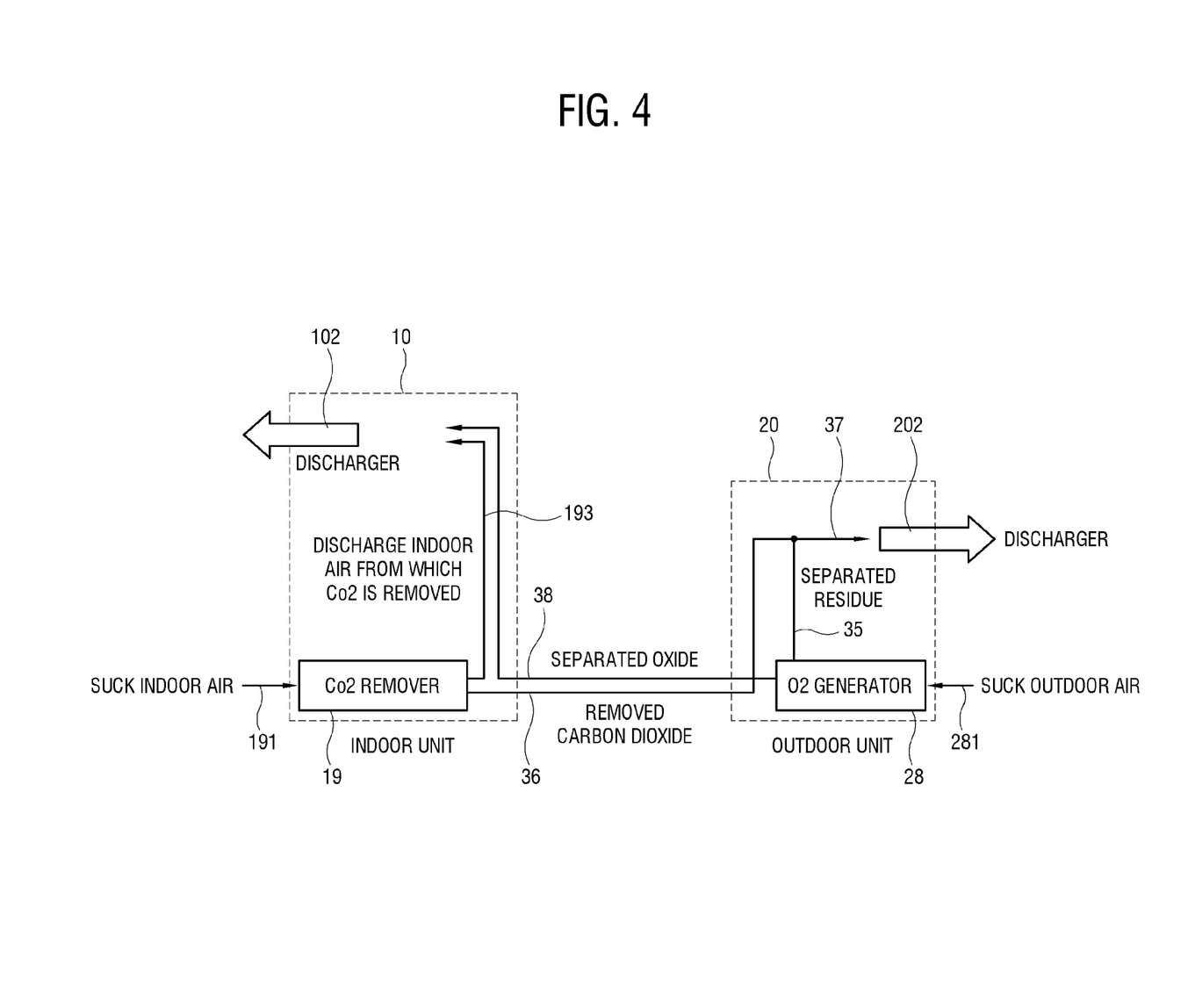
FIG. 4 is a diagram illustrating structures of a carbon dioxide remover and an oxygen generator of the air conditioner according to the first embodiment of the disclosure.
Figure 5:
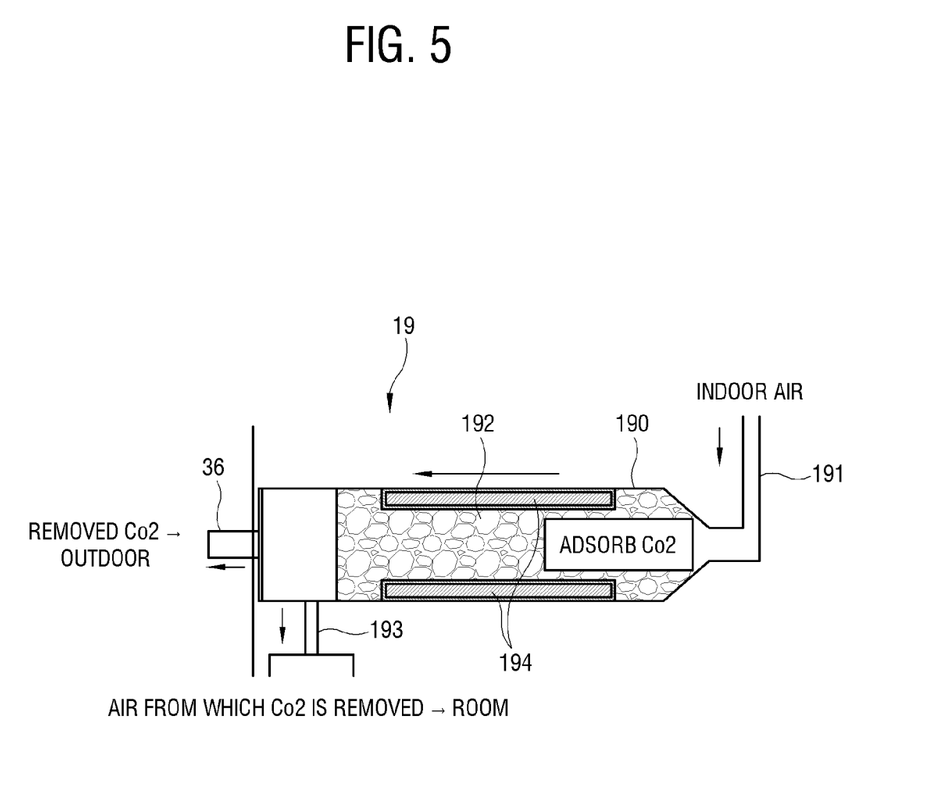
FIG. 5 is a diagram illustrating a configuration of the carbon dioxide remover in FIG. 4.
Figure 6:
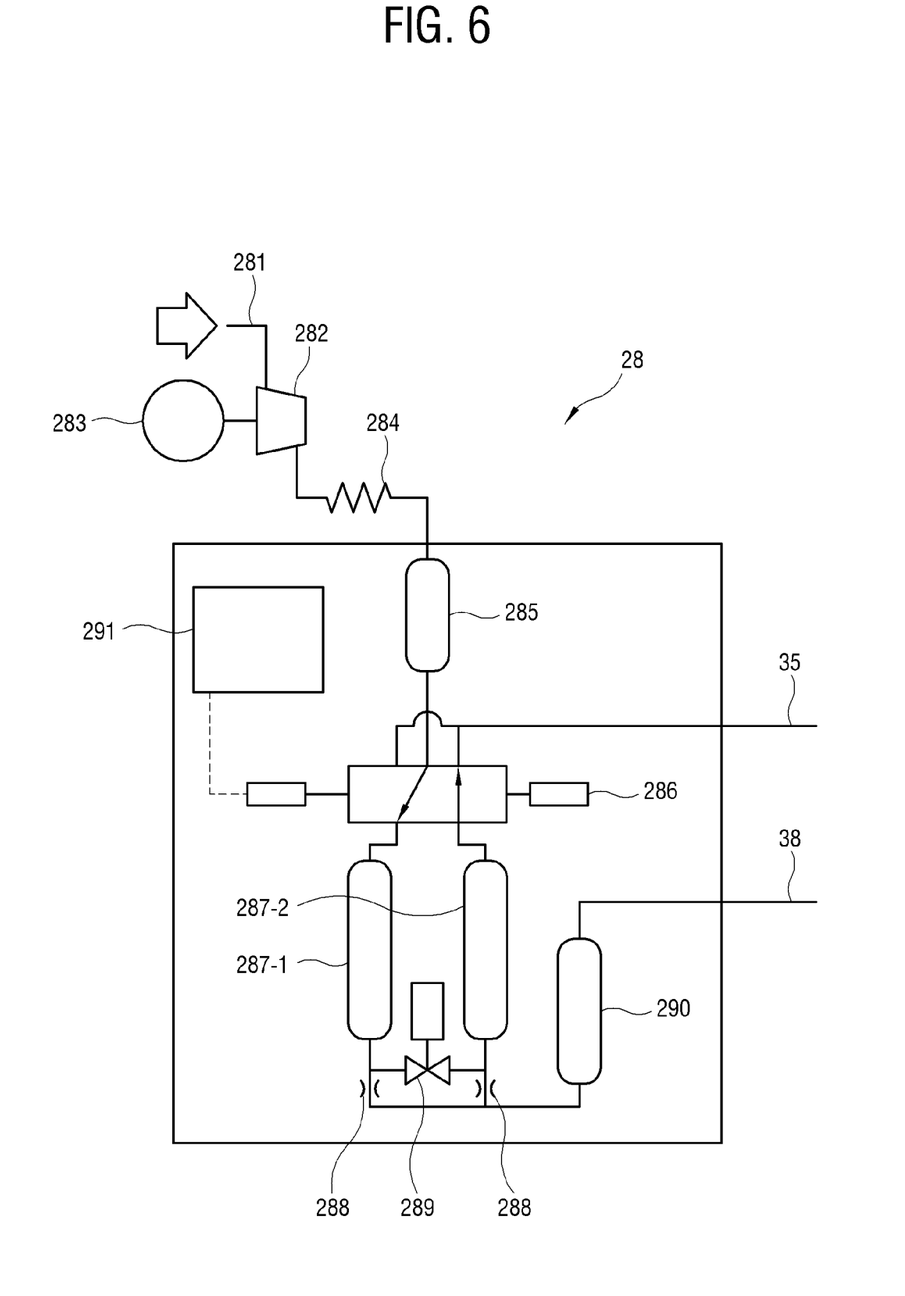
FIG. 6 is a diagram illustrating a configuration of the oxygen generator in FIG. 4.

FIG. 4 is a diagram illustrating a connection structure between the carbon dioxide remover 19 and the oxygen generator 28 of the air conditioner 1 according to the first embodiment of the disclosure, FIG. 5 is a diagram illustrating a structure of the carbon dioxide remover 19, and FIG. 6 is a diagram illustrating a structure of the oxygen generator 28.

The carbon dioxide remover 19 is installed in the indoor unit 10, and the oxygen generator 28 is installed in the outdoor unit 20.

The carbon dioxide remover 19 includes an indoor air suctionor 191 that sucks indoor air, an air discharge pipe 193 that provides air from which carbon dioxide has been removed from the sucked indoor air, and a first exhaust pipe 36 that discharges carbon dioxide adsorbed and removed from the indoor air.

The oxygen generator 28 includes an outdoor air suctionor 281 that sucks outdoor air, a supply pipe 38 that supplies the generated oxygen to the indoor unit 10, and a second exhaust pipe 35 that discharges residues other than oxygen.

The first exhaust pipe 36 and the second exhaust pipe 35 are joined together by the third exhaust pipe 37 in the outdoor unit 20. Accordingly, the carbon dioxide separated from the indoor air and the residues other than oxygen generated from the oxygen generator 28, which are joined by the third exhaust pipe 37, are discharged to the outside through the discharger 202 of the outdoor unit 20. In this case, the discharger 202 and the outdoor air suctionor 281 may be arranged so as to be separated from each other to prevent the carbon dioxide and residues discharged through the discharger 202 from being sucked into the outdoor air suctionor 281. In addition, the second processor (23 of FIG. 3) may drive the second blower fan 26 in accordance with the timing of discharging the carbon dioxide and/or residues through the discharger 202 and blow the carbon dioxide and/or residues away. As a result, it is possible to prevent the carbon dioxide and/or residues from being re-sucked into the oxygen generator 28.

The air from which the carbon dioxide has been removed from the carbon dioxide remover 19 through the air discharge pipe 193 and the oxygen supplied through the supply pipe 38 of the oxygen generator 28 are discharged to the room through the discharger 102 of the indoor unit 10.

FIG. 5 illustrates a so-called packed bed type carbon dioxide remover 19. Obviously, the carbon dioxide remover 19 may be applied in other types such as a rotor method in addition to the packed bed type.

As illustrated, the carbon dioxide remover 19 includes a bed 190 filled with an adsorbent 192 for adsorbing carbon dioxide therein, and a heater 194 disposed to surround the adsorbent 192 in the bed 190.

The adsorbent 192 may be made of at least one of zeolite, a metal organic framework (MOF), and a porous carbon material.

The carbon dioxide remover 19 sucks indoor air through the indoor air suctionor 191 and passes between the adsorbents 192 in the bed 190 to adsorb and remove carbon dioxide. Air from which the carbon dioxide has been removed is supplied to the air discharge pipe 193. Meanwhile, when the carbon dioxide is removed for a predetermined period of time, the carbon dioxide is adsorbed to the adsorbent 192 in the bed 190. The carbon dioxide adsorbed by the adsorbent 192 is removed by heating by the heater 194 or pressurization by a pump, and discharged to the outdoor unit 20 through the first exhaust pipe 36.

In order to simultaneously perform the process of removing carbon dioxide from indoor air and discharging the adsorbed carbon dioxide, additional beds may be installed in parallel, and carbon dioxide may be removed and discharged alternately using two beds. In addition, a rotor-type carbon dioxide remover may be applied as another method of simultaneously performing the process of removing carbon dioxide from indoor air and discharging the adsorbed carbon dioxide.

Referring to FIG. 6, the oxygen generator 28 includes an outdoor air suctionor 281 that sucks an outdoor air, a compressor 282 that compresses outdoor air, a motor 283 that drives the compressor 282, a heat exchanger 284 that cools the compressed air, a surge tank 285 that absorbs and alleviates a water hammering action, a 4-way solenoid valve 286, a pair of molecular sieve beds 287-1 and 287-2 filled with molecular sieves with different adsorption power depending on a gas component, a pressure reducing orifice 288, a crossover valve 289, an oxygen storage tank 290, and a control circuit 291.

Referring to FIG. 6, the temperature of the air compressed by the compressor 282 is lowered in the heat exchanger 284 in order to increase the adsorption power in the adsorption process, and then the air compressed by the compressor 282 is injected into one 287-1 of the two molecular sieve beds 287-1 and 287-2. Nitrogen molecules in the air are adsorbed into the molecular sieve before oxygen molecules according to the difference in the adsorption power. When the molecular sieve is saturated by nitrogen molecules, the solenoid valve 286 is operated by the control circuit 291 to transfer the compressed air to the other bed 287-2, thereby producing oxygen.

Meanwhile, the bed 287-1 saturated with nitrogen gas performs a purge process to regenerate the molecular sieve. The residues separated from the saturated bed 287-1 during the purge process are discharged through the second exhaust pipe 35.

The concentrated oxygen that has passed through the molecular sieve beds 287-1 and 287-2 passes through the orifice 288, is stored in the oxygen storage tank 290, and then is transmitted to the indoor unit 10 through the supply pipe 38. Most of the oxygen produced in this way passes through the pressure reducing orifice 288 and is used to purge the bed 287-2 saturated with nitrogen, and only a part of the produced oxygen is transmitted to the indoor unit 10.

The above-described repeating process is performed every tens of seconds, and the molecular sieve can be continuously repeatedly adsorbed/desorbed. During this repeating process of the suction/desorption, when the two beds 287-1 and 287-2 change suction/desorption from each other, the solenoid valve 286 instantly blocks all fluids injected into the beds 287-1 and 287-2, and opens the crossover valve 289 to balance the pressure between the two beds 287-1 and 287-2.

As another embodiment, the compressor 282 of the oxygen generator 28 may be used together to compress a refrigerant.

As another embodiment, both the carbon dioxide remover 19 and the oxygen generator 28 may be installed in the indoor unit 10 or the outdoor unit 20. When both the carbon dioxide remover 19 and the oxygen generator 28 are installed in the indoor unit 10, the outdoor air suctionor 281 for sucking the outdoor air of the oxygen generator 28 may be provided with an additional pipe (not illustrated) that extends to the indoor unit 10. When both the carbon dioxide remover 19 and the oxygen generator 28 are installed in the outdoor unit 20, the air discharge pipe 193 for discharging indoor air may include a pipe (not illustrated) for supplying air, from which carbon dioxide has been removed, provided between the outdoor unit 20 and the indoor unit 10.

Hereinafter, a method of controlling an air conditioner 1 according to the first embodiment of the disclosure will be described in detail.

Figure 7:
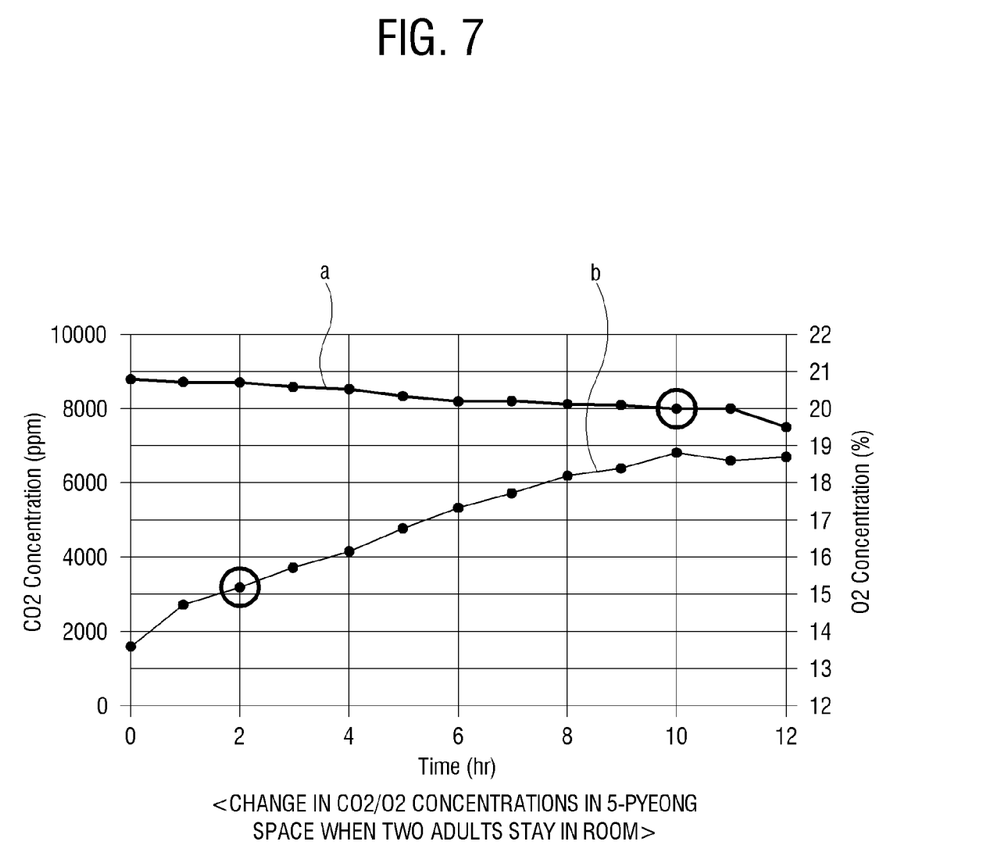
FIG. 7 is a graph illustrating changes in carbon dioxide and oxygen concentrations over time in a room.

FIG. 7 is a graph illustrating the change in the concentrations of carbon dioxide and oxygen over time in the room, which is a result of measuring the oxygen and carbon dioxide concentrations over time when two adults stay in a room of 5 pyeong (about 3.305785 $m^2$). As illustrated in the graph (a), oxygen is gradually consumed by respiration and gradually decreases from 21% which is an average atmospheric concentration to 20% after 8 hours, and as illustrated in the graph (b), carbon dioxide is generated and accumulated by respiration, and rapidly increases to more than 3000 ppm after 2 hours. Therefore, assuming that the optimal indoor air composition is that an oxygen concentration is 21 to 22%, and carbon dioxide is 1000 ppm or less, and comparing the change in the concentration of each gas over time and the human body reaction concentration to each gas, oxygen starts to react from 20% or less and carbon dioxide starts to react from 3000 ppm or more. Therefore, it can be seen that among the carbon dioxide and the oxygen, the gas that affects the human body within a faster time is the carbon dioxide, and therefore, should be removed first.

Based on this fact, a process of controlling the air conditioner 1 according to the first embodiment of the disclosure will be described with reference to FIG. 8.

Figure 8:
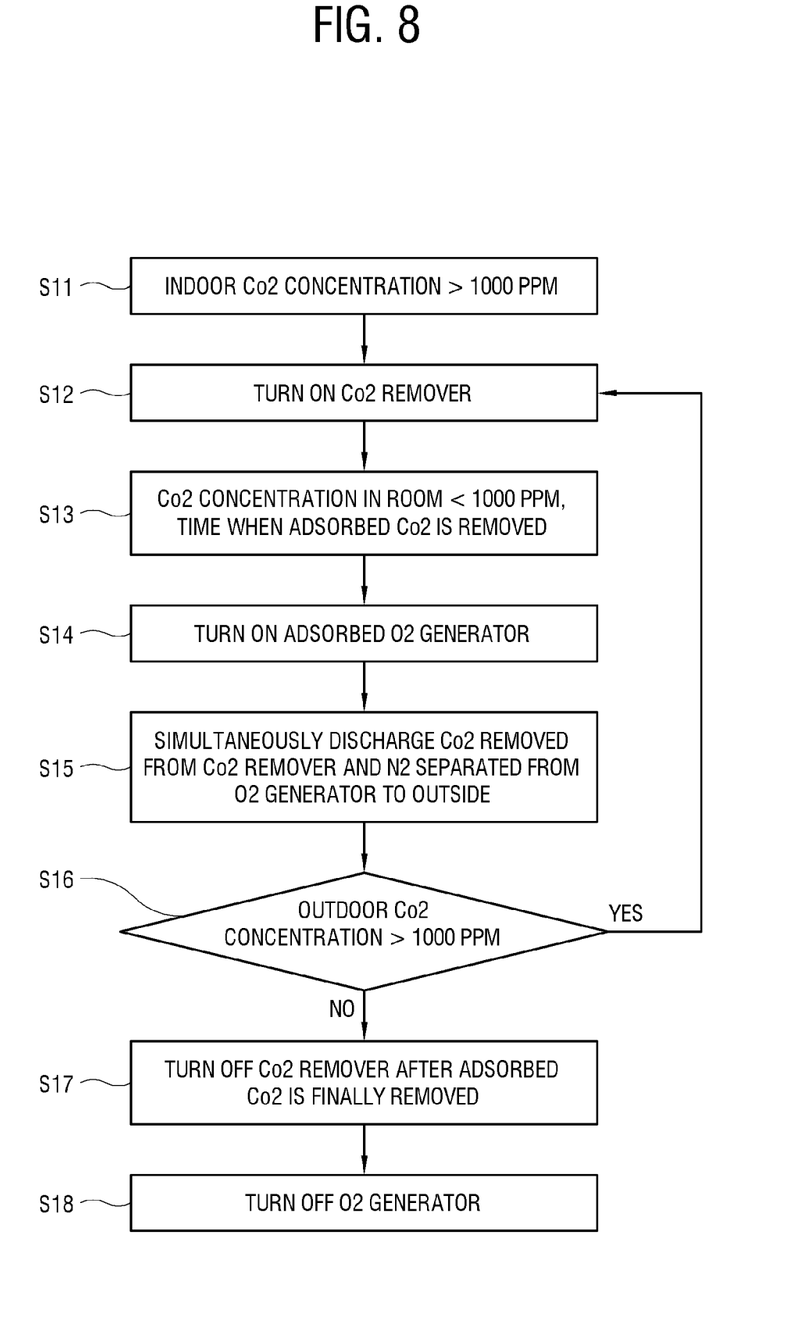
FIG. 8 is a flowchart illustrating a process of controlling an air conditioner according to the first embodiment of the disclosure.

FIG. 8 is a flowchart illustrating a process of controlling an air conditioner according to the first embodiment of the disclosure.

In step S11, when the carbon dioxide concentration in the room is detected by the carbon dioxide sensor 18 and exceeds 1000 ppm, the operation of the carbon dioxide remover 19 starts. Obviously, the user may input an operation command of the carbon dioxide remover 19 through the input 14.

In step S12, when the operation of the carbon dioxide remover 19 starts, an operation of a pump or a fan motor (not illustrated) on the indoor air suctionor 191 that sucks indoor air starts.

In step S13, the carbon dioxide remover 19 repeats the adsorption and regeneration of the carbon dioxide with the adsorbent 192. When the adsorption is performed for a certain period of time, the heat or pressure is controlled to remove the previously adsorbed carbon dioxide and discharge the high-concentration carbon dioxide to the outside.

In step S14, the operation of the oxygen generator 28 installed in the outdoor unit 20 starts at a time point in step S13.

In step S15, the carbon dioxide removed by the carbon dioxide remover 19 and the residues (mainly nitrogen) other than the oxygen separated by the oxygen generator 28 are discharged to the outside through the third exhaust pipe 37 together. In this case, the method of discharging carbon dioxide through a first exhaust pipe 36 uses the pressure difference between the first exhaust pipe 36 and the third exhaust pipe 37 by pressurizing the oxygen generator 28 with the compressor 282 to discharge the residues. This method is effective when a distance between the indoor unit 10 and the outdoor unit 20 is close. When the distance between the indoor unit 10 and the outdoor unit 20 is too far and the pressure is low or noise is high, the exhaust pump (not illustrated) may be installed in the third exhaust pipe 37 or a Venturi pipe (not illustrated) may be installed to prevent a pressure loss, so the carbon dioxide and residues may be effectively discharged.

As described above, the reason why it is necessary to remove the carbon dioxide first and then generate the oxygen is as follows.

First, as described above, a generation rate of the carbon dioxide is higher than a decrease rate of the oxygen in the indoor air.

Second, a membrane method or a pressure swing adsorption (PSA) method are mainly applied to the oxygen generator 28. Both the methods require a pressurizing means such as a compressor or a high-capacity pump to separate nitrogen and oxygen through pressurization, and therefore, the high-concentration carbon dioxide discharged from the carbon dioxide remover 19 and the residues separated from the oxygen generator 28 are joined into one by using the pressure difference generated during the pressurization and discharged to the outside.

In the case of the pressurizing means, for example, the compressor, a pressure of 10 to 30 Psi should be applied to a separator to make the concentrated oxygen (a discharged oxygen concentration of 40% or more, a flow rate of 5 LPM or more), and in the case of the structure in which the pressure on the separation side of the residue is maintained, a pressure difference of 5 Psi may be maintained, allowing high-concentration carbon dioxide to be discharged together.

In this way, when the carbon dioxide remover 19 and the oxygen generator 28 operate at different times and thus the high-concentration carbon dioxide discharged from the room and the residues separated from the outdoor unit 20 are combined and discharged to one exhaust means, the system may be simplified and the efficient system operation is possible.

In step S16, the concentration of the carbon dioxide contained in the indoor air is measured. When the carbon dioxide concentration still exceeds 1000 ppm, the previous steps S12 to S15 are repeated, and when the carbon dioxide concentration is less than 1000 ppm, the next step is performed.

In step S17, when the carbon dioxide in the indoor air is 1000 ppm or less, after the final regeneration (removal of the carbon dioxide) of the carbon dioxide remover 19 has finished, by removing all the adsorbent of the carbon dioxide remaining inside the carbon dioxide remover 19 and the high-concentration carbon dioxide remaining in the exhaust pipe connected to the outside for a certain period of time, it is possible to improve the lifespan and durability of the system.

In step S18, the operation of the oxygen generator 28 stops after all the remaining carbon dioxide is discharged.

Figure 9:
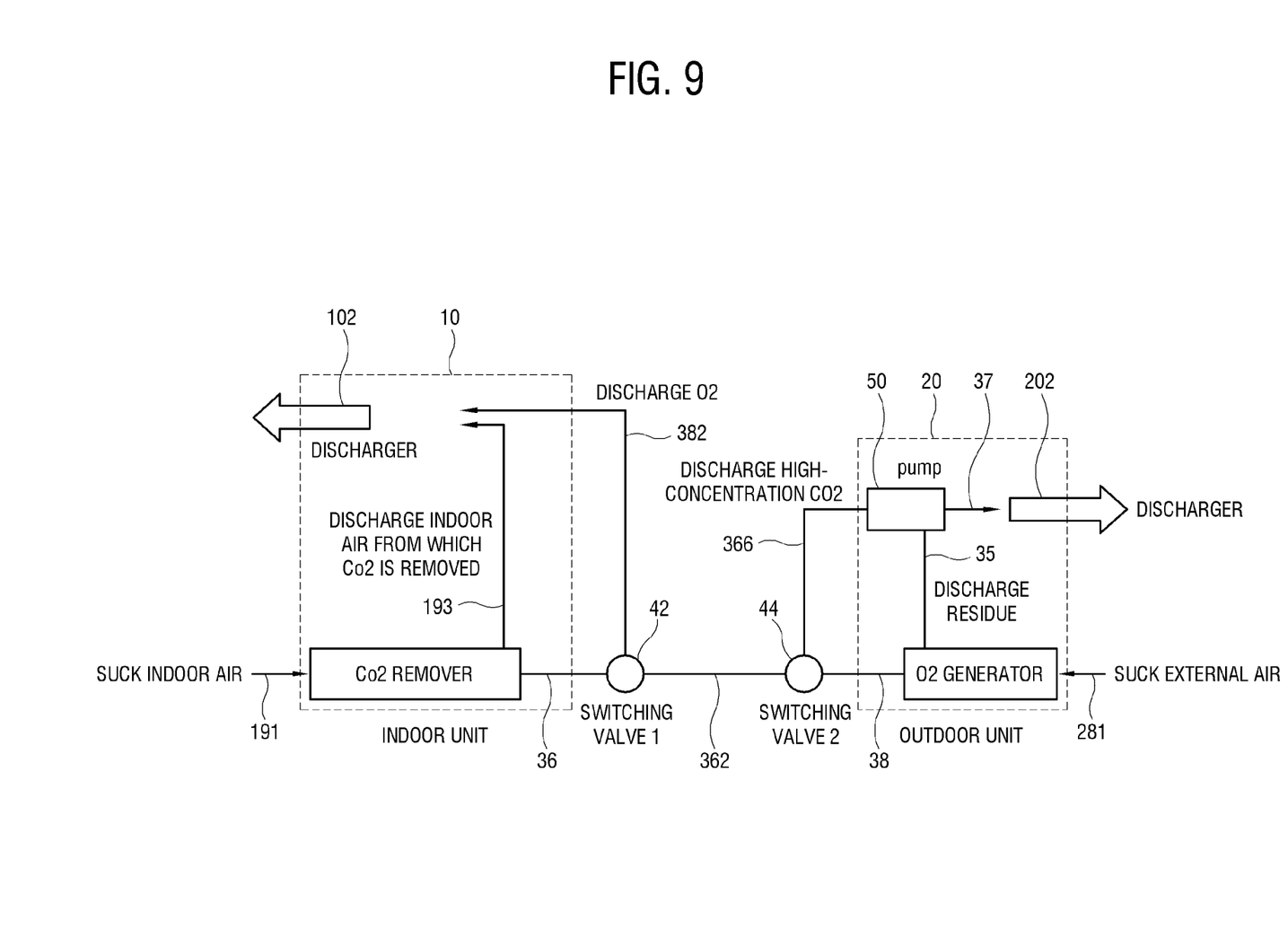
FIG. 9 is a diagram illustrating structures of a carbon dioxide remover and an oxygen generator of an air conditioner according to a second embodiment of the disclosure.

FIG. 9 is a diagram illustrating structures of a carbon dioxide remover and an oxygen generator of an air conditioner according to a second embodiment of the disclosure.

As illustrated, the carbon dioxide remover 19 is installed in the indoor unit 10, and the oxygen generator 28 is installed in the outdoor unit 20.

The carbon dioxide remover 19 includes the indoor air suctionor 191 that sucks indoor air, the air discharge pipe 193 that provides air from which carbon dioxide has been removed to a room, and the first exhaust pipe 36 that discharges carbon dioxide adsorbed and removed from the indoor air.

The oxygen generator 28 includes an outdoor air suctionor 281 that sucks outdoor air, a supply pipe 38 that supplies the generated oxygen to the indoor unit 10, and a second exhaust pipe 35 that discharges residues other than oxygen.

The first exhaust pipe 36 and the supply pipe 38 are connected by a single connection pipe 362. A switching valve 1 42 is provided between the first exhaust pipe 36 and the connection pipe 362, and a switching valve 2 44 is provided between the first exhaust pipe 36 and the supply pipe 38. The switching valve 1 42 is connected to a first branch pipe 382 that supplies oxygen supplied from the outdoor unit 20 to the indoor unit 10 through the connection pipe 362. The switching valve 2 44 includes a second branch pipe 366 for discharging carbon dioxide discharged from the indoor unit 10 to the third exhaust pipe 37 through the connection pipe 362. Accordingly, the operations of the carbon dioxide remover 19 and the oxygen generator 28 may be separately controlled so that carbon dioxide is discharged and oxygen is supplied through a single connection pipe 362.

An exhaust pump 50 is provided between the second branch pipe 366, the second exhaust pipe 35, and the third exhaust pipe 37 to discharge the carbon dioxide and the residues with gauze. In this way, the carbon dioxide and the residues joined to the third exhaust pipe 37 are discharged to the outside through the discharger 202 of the outdoor unit 20 by the exhaust pump 50. The exhaust pump 50 may be replaced with the compressor 282 of the oxygen generator 28 or the Venturi pipe (not illustrated) for preventing the pressure loss. As described above, the third exhaust pipe 37 includes the exhaust pump 50 or the Venturi pipe, thereby discharging the carbon dioxide separated from the indoor air and the residues other than the oxygen generated from the oxygen generator 28 together. In this case, the discharger 202 and the outdoor air suctionor 281 may be arranged so as to be separated from each other to prevent the carbon dioxide and residues discharged through the discharger 202 from being sucked into the outside air suctionor 281. In addition, the second processor (23 of FIG. 3) may drive the second blower fan 26 in accordance with the timing of discharging the carbon dioxide and/or residues through the discharger 202 and blow the carbon dioxide and/or residues away.

As described above, according to the disclosure, the efficient operation is possible by interlocking the operation of the oxygen generator with the removal of carbon dioxide in the air conditioner, thereby saving the energy consumption. In addition, by discharging the carbon dioxide separated from the indoor air and the residues other than the oxygen generated from the oxygen generator 28 together, the structure and installation thereof are simple, and the space may be easily secured.

Figure 10:
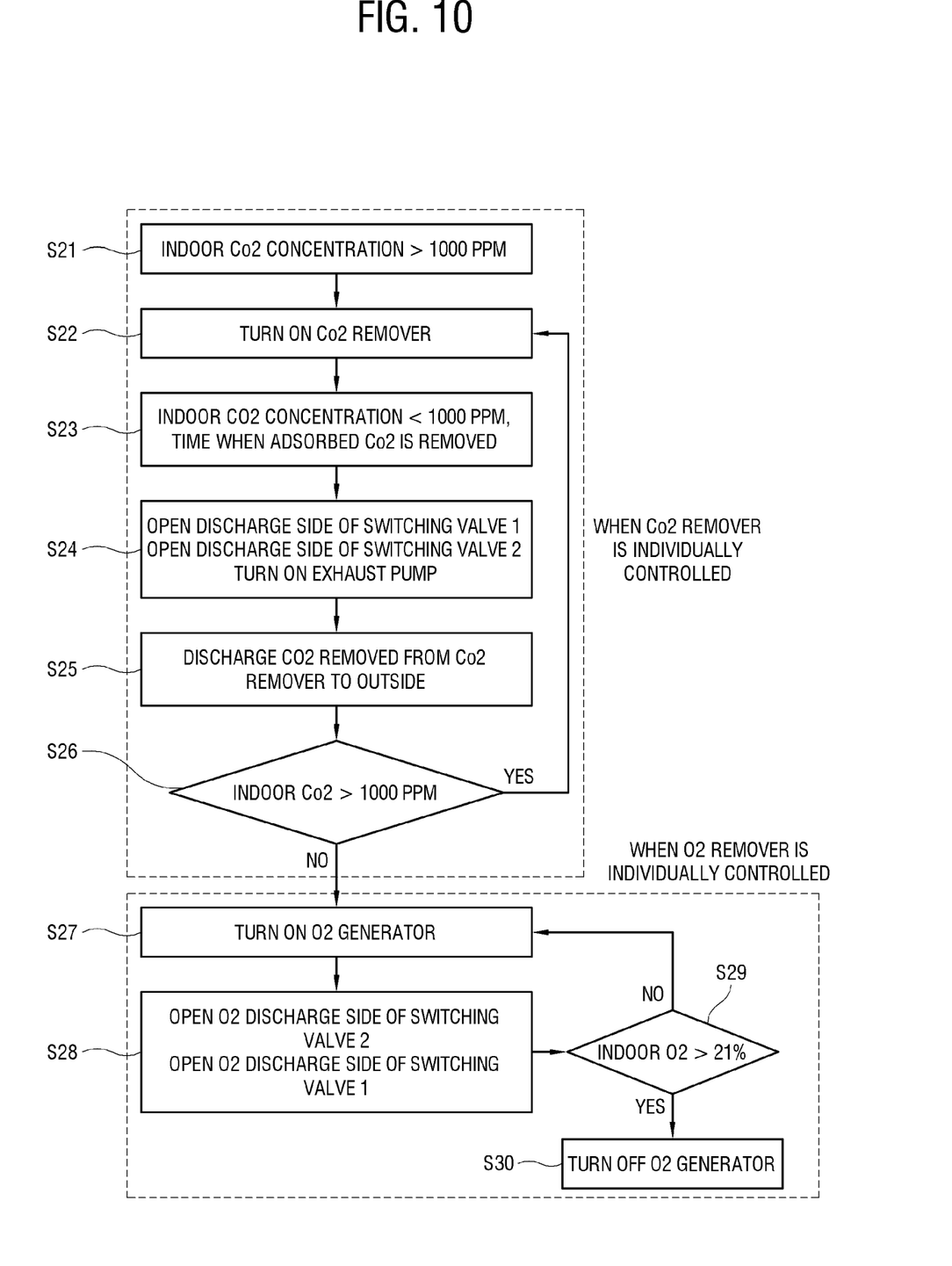
FIG. 10 is a flowchart illustrating a process of controlling an air conditioner according to the second embodiment of the disclosure.

FIG. 10 is a flowchart illustrating a process of controlling an air conditioner according to the second embodiment of the disclosure.

In step S21, when the carbon dioxide concentration in the room is detected by the carbon dioxide sensor 18 and exceeds 1000 ppm, the operation of the carbon dioxide remover 19 starts. Obviously, the user may input an operation command of the carbon dioxide remover 19 through the input 14.

In step S22, when the operation of the carbon dioxide remover 19 starts, an operation of the pump or the fan motor (not illustrated) on the indoor air suctionor 191 that sucks indoor air starts.

In step S23, the carbon dioxide remover 19 repeats the adsorption and regeneration of the carbon dioxide with the adsorbent 192. When the adsorption is performed for a certain period of time, the heat or pressure is controlled to remove the previously adsorbed carbon dioxide and discharge the high-concentration carbon dioxide to the outside.

In step S24, the switching valve 1 42 and the switching valve 2 44 are switched and opened to the carbon dioxide exhaust side, and the exhaust pump 50 is operated.

In step S25, the carbon dioxide removed by the carbon dioxide remover 19 according to the operation of the exhaust pump 50 is discharged to the third exhaust pipe 37 through the first exhaust pipe 36, the connection pipe 362, and the second branch pipe 366.

In step S26, the concentration of carbon dioxide contained in the indoor air is measured. When the carbon dioxide concentration still exceeds 1000 ppm, the previous steps S22 to S25 are repeated, and when the carbon dioxide concentration is less than 1000 ppm, the next step is performed.

In step S27, when the carbon dioxide in the indoor air is 1000 ppm or less, the oxygen generator 28 is operated.

In step S28, the switching valve 1 42 and the switching valve 2 44 are switched and opened to the oxygen exhaust side, so the oxygen generated in the oxygen generator 28 is supplied to the indoor unit 10 through the supply pipe 38, the connection pipe 362, and the first branch pipe 382.

In step S29, the oxygen in the indoor air is measured to determine whether the oxygen exceeds 21%. When the oxygen is 21% or less, the previous step S27 is performed, and when the oxygen exceeds 21%, the next step is performed.

In step S30, when the oxygen in the indoor air exceeds 21%, the operation of the oxygen generator 28 stops.

As another embodiment, when there is a user input button ($CO_2$ removal mode, oxygen generation mode), it is also possible to separately control the above-described algorithm for each section.

Although the preferred embodiments of the disclosure have been illustrated and described above, the disclosure is not limited to the specific embodiments described above, and can be variously modified by those skilled in the art to which the disclosure pertains without departing from the gist of the disclosure claimed in the claims, and these modifications should not be understood individually from the technical ideas or prospects of the disclosure.

The invention claimed is:

1. An air conditioner, comprising:
   an indoor unit including a carbon dioxide remover configured to
      filter carbon dioxide from indoor air to supply clean air into a room;
   an outdoor unit including a discharger and an oxygen generator configured to:
      discharge the filtered carbon dioxide to an outside via the discharger,
      separate oxygen from outdoor air introduced from an outside of the air conditioner to supply the separated oxygen into the room, and
      discharge residues from which the oxygen is separated to the outside;
   an air discharge pipe configured to provide into the room the clean air from which the carbon dioxide has been removed from the indoor air;
   a first exhaust pipe configured to discharge the filtered carbon dioxide from the indoor unit to outdoor unit;
   a second exhaust pipe configured to discharge the residues by the oxygen generator;
   a third exhaust pipe coupled to the discharger and configured to join the first exhaust pipe and the second exhaust pipe; and
   a processor configured to control the carbon dioxide remover and the oxygen generator to discharge the filtered carbon dioxide and the residues to the outside together via the third exhaust pipe and the discharger.

2. The air conditioner of claim 1,
   wherein the oxygen generator includes a compressor that applies a pressure to the introduced outside air, and
   wherein the compressor is configured to:
      discharge the residues through the second exhaust pipe and the third exhaust pipe, and
      provide a pressure difference between the first exhaust pipe and the third exhaust pipe to discharge the filtered carbon dioxide through the first exhaust pipe.

3. The air conditioner of claim 1, further comprising:
   a refrigerant pipe configured to circulate a refrigerant between the indoor unit and the outdoor unit and an oxygen supply pipe configured to supply the separated oxygen,
   wherein the refrigerant pipe and the oxygen supply pipe are integrally coupled and extended.

4. The air conditioner of claim 1,
   wherein the processor is configured to control the carbon dioxide remover and the oxygen generator to first perform the filtering and supplying of the carbon dioxide and then perform the separation and supply of the oxygen.

5. The air conditioner of claim 1,
wherein the carbon dioxide remover includes an adsorbent made of at least one of zeolite, a metal organic framework (MOF), and a porous carbon material.

6. The air conditioner of claim 1, further comprising:
a first supply pipe configured to connect an oxygen supply port of the oxygen generator;
a connection pipe configured to connect the first exhaust pipe and the first supply pipe;
a first switching valve configured to be provided between the first exhaust pipe and the connection pipe; and
a second switching valve configured to be provided between the first supply pipe and the connection pipe.

7. The air conditioner of claim 6,
wherein the carbon dioxide remover is configured to operate in a carbon dioxide removal mode for filtering carbon dioxide from the indoor air to supplying the clean air into the room and a carbon dioxide discharge mode for discharging the filtered carbon dioxide to the outside, and
wherein the oxygen generator is configured to operate in an oxygen supply mode in which the outdoor air introduced from the outside is pressurized to separate the oxygen and the residues to supply into the room, and an oxygen discharge mode in which the separated residues are discharged to the outside.

8. The air conditioner of claim 7,
wherein the processor is configured to control the first and second switching valves to sequentially perform the carbon dioxide discharge mode and the oxygen supply mode through the connection pipe.

9. The air conditioner of claim 1,
wherein the outdoor unit includes a blower fan, and
wherein the processor is configured to operate the blower fan when the carbon dioxide is discharged and the residues are discharged.

10. An air conditioner, comprising:
an indoor unit;
an outdoor unit; and
a processor configured to control the indoor unit and the outdoor unit,
wherein the indoor unit or the outdoor unit includes:
  a carbon dioxide remover configured to filter carbon dioxide from indoor air to supply clean air into a room, and discharge the filtered carbon dioxide; and
  an oxygen generator configured to separate oxygen from outdoor air introduced from an outside to supply the separated oxygen into the room, and discharge residues from which the oxygen is separated to the outside,
wherein the air conditioner further comprises:
  an air discharge pipe configured to provide into the room the clean air from which the carbon dioxide has been removed from the indoor air;
  a first exhaust pipe configured to discharge the filtered carbon dioxide;
  a second exhaust pipe configured to discharge the residues by the oxygen generator; and
  a third exhaust pipe configured to join the first exhaust pipe and the second exhaust pipe, and
wherein the processor is configured to control the carbon dioxide remover and the oxygen generator to discharge the filtered carbon dioxide and the residues to the outside together via the third exhaust pipe.

11. The air conditioner of claim 10,
wherein the indoor unit includes the carbon dioxide remover and the oxygen generator, and
wherein the outdoor unit includes a suctionor configured to suck outdoor air and a discharger coupled to the third exhaust pipe and configured to discharge the carbon dioxide generated from the indoor unit.

12. The air conditioner of claim 11,
wherein the outdoor unit includes a blower fan,
wherein the suctionor is located on an opposite side of the blower fan, and
wherein the discharger is located on the blower fan so that the carbon dioxide discharged to the outside does not flow back into the suctionor.

13. An air conditioner, comprising:
a carbon dioxide remover configured to operate in a carbon dioxide removal mode in which carbon dioxide is filtered from indoor air to supply clean air into a room and a carbon dioxide discharge mode in which the filtered carbon dioxide is discharged to an outside of the carbon dioxide remover;
an oxygen generator configured to operate in an oxygen separation mode in which outdoor air introduced from an outside of the air conditioner is pressurized and separated into oxygen and residues to supply into the room and an oxygen discharge mode in which the separated residues are discharged to an outside;
an air discharge pipe configured to provide into the room the clean air from which the carbon dioxide has been removed from the indoor air;
a first exhaust pipe configured to discharge the filtered carbon dioxide;
a second exhaust pipe configured to discharge the residues by the oxygen generator;
a third exhaust pipe configured to join the first exhaust pipe and the second exhaust pipe; and
a processor configured to simultaneously perform the carbon dioxide discharge mode and the oxygen discharge mode so that the filtered carbon dioxide and the separated residues are discharged together.

14. A method for controlling an air conditioner, comprising:
operating a carbon dioxide remover in an indoor unit to absorb carbon dioxide from indoor air with an adsorbent to filter the carbon dioxide and supply clean air through an air discharge pipe into a room;
operating the carbon dioxide remover to remove the adsorbed carbon dioxide to discharge the adsorbed carbon dioxide through a first exhaust pipe, and simultaneously operating an oxygen generator in an outdoor unit to pressurize an outdoor air introduced from an outside to separate oxygen from residues to supply the oxygen into the room and to discharge the residues through a second exhaust pipe, the second exhaust pipe being joined with the first exhaust pipe by a third exhaust pipe; and
controlling the carbon dioxide remover and the oxygen generator to simultaneously discharge the removed carbon dioxide and the residues via the third exhaust pipe.

* * * * *